United States Patent
Krüger et al.

[11] Patent Number: 6,135,561
[45] Date of Patent: Oct. 24, 2000

[54] SEAT BACK WITH HEADREST ON VEHICLE SEATS

[75] Inventors: Norbert Krüger, Essen; Edvard Rückert, Velbert, both of Germany

[73] Assignee: Ewald Witte GmbH & Co. KG, Velbert, Germany

[21] Appl. No.: 09/135,640

[22] Filed: Aug. 18, 1998

[30] Foreign Application Priority Data

Dec. 3, 1997 [DE] Germany ............... 197 54 311

[51] Int. Cl.$^7$ .............. A47C 1/10; A47C 7/36; B60R 22/28
[52] U.S. Cl. ............... 297/408; 297/216.1; 297/216.12; 297/216.13; 297/480
[58] Field of Search ............... 297/408, 216.1, 297/216.12, 216.13, 480, 483, 484

[56] References Cited

U.S. PATENT DOCUMENTS

| | | |
|---|---|---|
| 2,973,029 | 2/1961 | Schlosstein . |
| 3,655,241 | 4/1972 | Herzer et al. . |
| 3,838,870 | 10/1974 | Hug ............... 297/216.12 X |
| 3,964,788 | 6/1976 | Kmetyko . |
| 4,278,291 | 7/1981 | Asai . |
| 4,687,253 | 8/1987 | Ernst et al. ............... 297/480 X |
| 4,720,146 | 1/1988 | Mawbey et al. . |
| 4,762,367 | 8/1988 | Denton . |
| 4,822,102 | 4/1989 | Duvenkamp . |
| 5,137,226 | 8/1992 | Fujimura et al. ............... 297/480 X |
| 5,490,706 | 2/1996 | Totani ............... 297/216.1 X |
| 5,520,440 | 5/1996 | Lee ............... 297/216.13 X |
| 5,641,198 | 6/1997 | Steffens, Jr. ............... 297/216.13 |
| 5,676,421 | 10/1997 | Brodsky ............... 297/216.13 |
| 5,681,081 | 10/1997 | Lindner et al. ............... 297/216.13 X |
| 5,697,670 | 12/1997 | Husted et al. ............... 297/216.13 |
| 5,738,412 | 4/1998 | Aufrere et al. ............... 297/408 |
| 5,772,280 | 6/1998 | Massara ............... 297/216.12 |
| 5,833,312 | 11/1998 | Lenz ............... 297/216.12 X |
| 5,836,647 | 11/1998 | Turman ............... 297/216.1 |
| 5,836,648 | 11/1998 | Karschin et al. ............... 297/216.12 X |
| 5,884,968 | 3/1999 | Massara ............... 297/216.12 |

FOREIGN PATENT DOCUMENTS

| | | |
|---|---|---|
| 0627340 | 12/1994 | European Pat. Off. . |
| 2206329 | 9/1972 | Germany . |
| 2232726 | 1/1974 | Germany ............... 297/216.12 |
| 2430572 | 1/1976 | Germany . |

*Primary Examiner*—Peter M. Cuomo
*Assistant Examiner*—Rodney B. White
*Attorney, Agent, or Firm*—Martin A. Farber

[57] ABSTRACT

A seat back (35) with a headrest (40) on a vehicle seat (33). To reduce the whiplash effect during a front-end accident to a significant degree, the head rest (40) rests on a headrest support (38) that can be pivoted outward and forward around a horizontal axis (39), with the backward displacement of the support being restricted in terms of movement.

21 Claims, 11 Drawing Sheets

SEAT BACK WITH HEADREST ON VEHICLE SEATS

FIELD AND BACKGROUND OF THE INVENTION

In a front-end accident, the person on the vehicle seat is subjected to a health risk by virtue of the fact that as a result of the whiplash effect, following a forward displacement of the upper body restrained by the seat belt, the body is subjected to whiplash when the head is thrown against the headrest. This can cause cervical spine syndromes with the resultant disadvantages.

SUMMARY OF THE INVENTION

It is an object of the invention to design a seat back on vehicle seats of the type under discussion in such fashion that the whiplash effect is significantly reduced in the event of a front-end accident.

This object is achieved initially and essentially in a seat back based on the fact that the headrest rests on a headrest support that can be pivoted forward around a horizontal axis out of the seat back body, with the backward displacement of the headrest support being limited in terms of motion.

The subclaims relate to advantageous improvements on the solution according to the invention.

As a result of this invention, a seat back of the type under discussion receives an increased safety value. The whiplash effect that occurs during a front-end accident is largely eliminated. This advantageously takes place in such fashion that in a front-end accident, the upper body is initially displaced forward by the sudden deceleration. The headrest support can be engaged by the belt section resting on the shoulder. The headrest support however, because of the kinetic energy (inertia) inherent in it, can lag behind the upper body, so that when the vehicle comes to rest, the upper body together with the head is caught by the headrest support with the headrest mounted on it. Because of the motion-limited backward displacement of the headrest support, the corresponding rebound that results from the whiplash effect on the body is received and eased, so that damage to the health resulting from the whiplash effect is largely eliminated. The implementation of the outwardly pivoting headrest support and the motion-restricted backward displacement can be accomplished in different ways. For example, it would be possible to associate with the headrest support, a ratchet latch that triggers in a front-end accident but then causes a motion-restricted backward displacement of the headrest support, for example by means of appropriate frictional contact. One advantageous improvement on the invention is characterized by the fact that the motion restriction is achieved by a damping element located between the seat back body and the headrest support. This can be designed for example in the form of a shock absorber. When a shock absorber, for example a liquid shock absorber, is used, not only the backward displacement of the headrest support but also its forward displacement have their motion restricted. When a seat belt is used, it is advantageous to provide a belt guide in the headrest support with a clamping device for the seat belt. The clamping location for the seat belt is therefore located in an area where it has a favorable effect. The distance between the upper body and the headrest support remains small by virtue of the fact that the belt pulled by the body is simultaneously clamped in the latch and the headrest support is forcibly guided by the body. The forced guidance of the headrest support can also take place against spring pressure. In addition, a clamping device controlled by inertia and/or friction is advantageous, which begins to operate in a front-end accident practically simultaneously with the forward displacement of the headrest support. In an advantageous manner, the clamping device has clamping jaws that rest on clamping jaw supports arranged scissorwise. These supports, in the open resting position, abut stops of the headrest support while tensioned by springs. Thus, it is advantageous, especially in rear seats, for the retractor to be located in the vicinity of the seat plane, especially rearward thereof, and for the belt to be guided over deflecting means to the clamping device. It is advantageous for the deflecting means to be designed as damping members so that tensile stresses that arise abruptly do not result in tearing of the seat belt and reduce the stresses on the upper body. In simple fashion, the procedure is therefore such that the deflecting means are deflecting rollers that are guided in diagonal slots in the seat body and are supported by springs. In addition, it should be stressed that the horizontal axis lies approximately in the middle of the seat back and the clamping device is associated with the upper end of the headrest support, so that the headrest support also provides a certain amount of support for the back of the person, namely during a front-end accident of the vehicle. In addition, an advantageous feature consists in the fact that the headrest support rests in a shaft in the upholstery of the seat back. On the one hand, the shaft can be designed so that it is open in the outward pivoting direction. Then the headrest support has upholstery that fits flush to the upholstery surface of the seat back. However, it is also possible to make the shaft closed in the outwardly pivoting direction, namely by covering it with upholstery. However, this is done in such a way that it does not interfere with the outward pivoting of the headrest support in a front-end accident. In addition, the seat back is designed so that it is pivotably adjustable and the headrest is adjustable heightwise.

The headrest support can be designed in terms of its length so that it receives a partial length of the total length of the seat back. However, the headrest support can be made pivotable around the seat back axis, and especially to make it from the entire seat back. On the basis of this state of affairs, a separate axis for the headrest support can be eliminated, since its task is assumed by the seat back axis itself. The headrest support can contain a partial surface, especially a central partial surface of the seat back. However it is also possible for the entire seat back to constitute the headrest support. This means that in a front-end collision of the vehicle, it advances into the forward displacement position together with but after the headrest in order to counteract the whiplash effect, as described at the outset. In addition to a forward displacement of the headrest support by a clamping device, the measure also means that the forward displacement of the headrest support can also take place by the actuation of a trigger. This takes place in such fashion that when the trigger is actuated, a release of energy displaces the headrest forward. The actuation of the trigger depends on the forward displacement of the person who is on the vehicle seat, as can occur in a crash. On the one hand, the energy can be stored in a spring which in the basic position of the headrest support constitutes a spring force storage device. Following the actuation of the trigger, this force-storage device can be discharged and the headrest support can move forward as the headrest follows the head of the person who is on the vehicle seat. Another possibility consists in the energy being produced pyrotechnically. Actuation of the trigger however occurs only when a certain belt load is exceeded. One advantageous design is characterized by the fact that when the trigger is actuated, a hook is moved into a release position, said hook being linked in an operating connection by a rod drive with a mounting point of the seat belt. In order for only a displacement of the fastening point to take place in a dangerous situation, the fastening point of the seat belt can be displaced against the force of a pretensioned spring for triggering.

BRIEF DESCRIPTION OF THE DRAWINGS

With the above and other objects and other advantages in view, the present invention will become more clearly understood in connection with the detailed description of preferred embodiments, when considered with the accompanying drawings of which.

DETAILED DESCRIPTION OF THE PREFERRED EMODIMENTS

The vehicle seat shown in FIGS. 1 to 6, relating to the first embodiment, is a back seat of a vehicle designated as a whole by the number 1. The latter has a seat cushion 2 and seat back 3 associated therewith. The latter is displaceable stepwise around its lower horizontal pivot axis 4 located to the rear of the seat plane, for achieving different tilting positions of seat back 3. A guide rail that runs concentrically with respect to pivot axis 4 is represented by dot-dashed lines and is numbered 5, said rail allowing a stepwise adjustment of seat back 3. The device however can be used equally well on a front seat or on another vehicle seat.

Seat back 3 is equipped with a shaft 6 that is open at its top to receive a headrest support 7, whose upper end extends beyond seat back 3 and supports a headrest 8 there. The latter is adjustable vertically. In addition, there is a provision for pivoting headrest 8 around a horizontal tilting axis 9.

Headrest support 7 can be pivoted outward and forward at its lower end around a horizontal axis 10. The latter extends approximately in the middle of the seat back. In the embodiment, the shaft is covered by the upholstery of seat back body 12. However, it would also be possible to design shaft 6 so that it is open at the front and to cover the relative front surface of the headrest support 7 with upholstery so that the upholstery of headrest support 7 then abuts the upholstered surface of the seat back and/or the seat back body 12.

The backward displacement of headrest support 7 that can be pivoted outward and forward has its movement restricted. Similarly, the forward displacement of headrest support 7 is limited in terms of movement. The rearward displacement may be prevented by additional spring pressure. For this purpose, a spring can be provided parallel to damping member 11. Preferably one damping member 11 is associated with each of the two vertical sides of headrest support 7. One end 11' thereof abuts seat back body 12 while the other end 11" abuts headrest support 7. Damping member 11 can be designed as a shock absorber. It follows from the drawings that the arrangement of damping members 11 is located approximately in the center between the horizontal axis 10 and the upper edge of the seat back. The damping member can be made of a material with a memory function, for example foam or fluid.

In the upper area, the headrest support 7 is equipped with a belt feedthrough G for a seat belt 13. The belt feedthrough G includes a clamping device 14 that acts on seat belt 13. In the embodiment, the clamping device operates by the action of friction. The action of friction is achieved by virtue of the fact that the two clamping jaws assume a clamping position and thus grip the belt between them. In detail, clamping device 14 has opposing clamping jaws 15, 16 which in turn rest on clamping jaw supports 17, 18 arranged scissorwise. The latter are designed as one-armed levers and are pivoted around pins 19, 20 of headrest support 7. In the open resting position, clamping jaw supports 17, 18 abut stops 23, 24 of headrest support 7 by projections 21, 22 under the influence of springs. For this purpose, a mounted torsion spring 25 is associated with each pin 19, 20, said springs urging the clamping jaw supports 17, 18 in the direction of their application position.

In the open resting position of the clamping jaw supports 17, 18, there is little or no frictional contact between seat belt 13 and clamping jaws 15, 16, so that to apply them to safety belt 13, the latter can be pulled through without impediment. During a negative acceleration of the motor vehicle, the massive projections 21, 22, because of their inertia, are accelerated forward relative to the vehicle and/or headrest support 7, so that the two-clamping jaws 15, 16 move toward one another in a clamping action.

Figure 1:
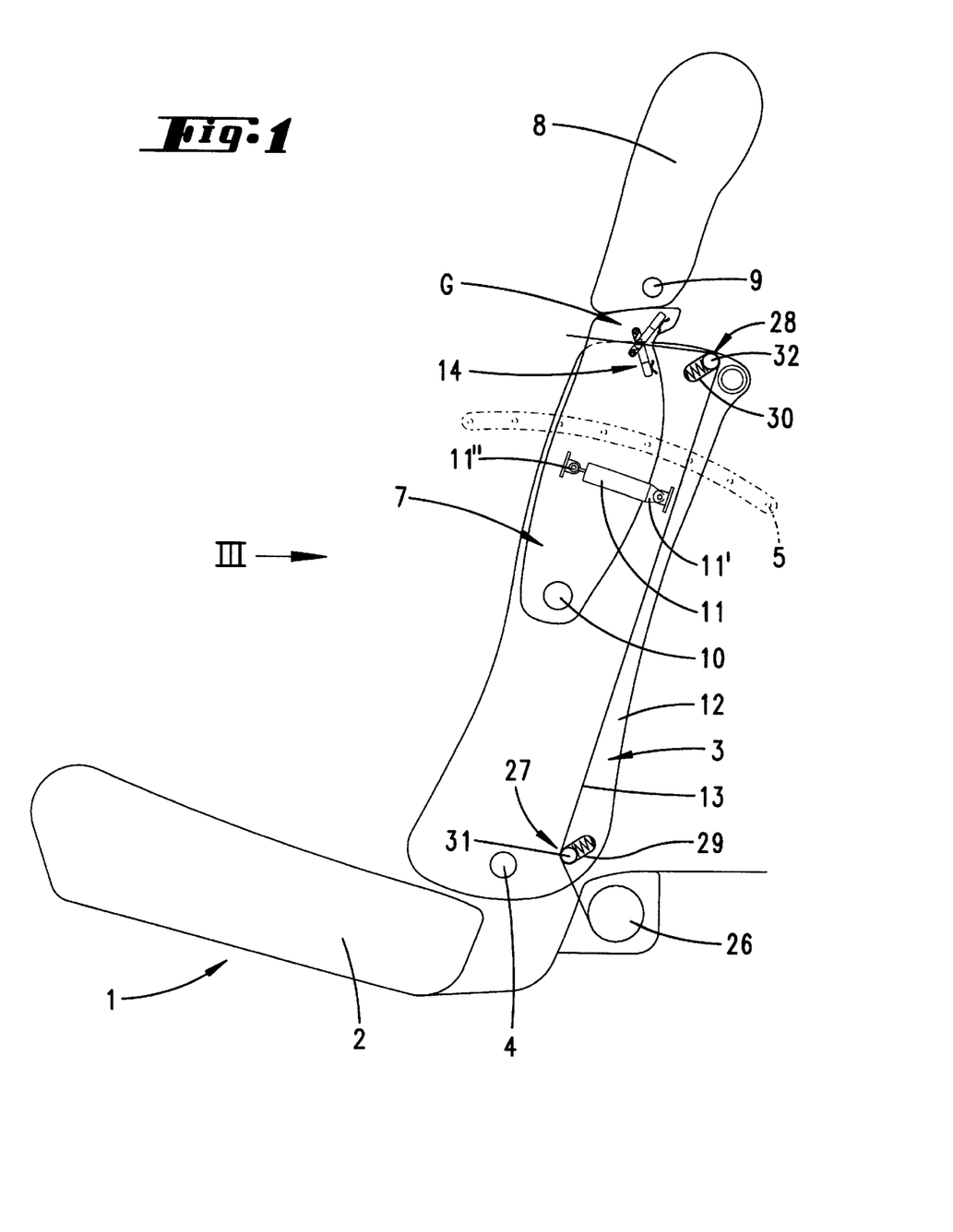
FIG. 1 is a schematic view of a seat back of a motor vehicle rear seat designed according to the invention, relating to the first embodiment.
Figure 2:
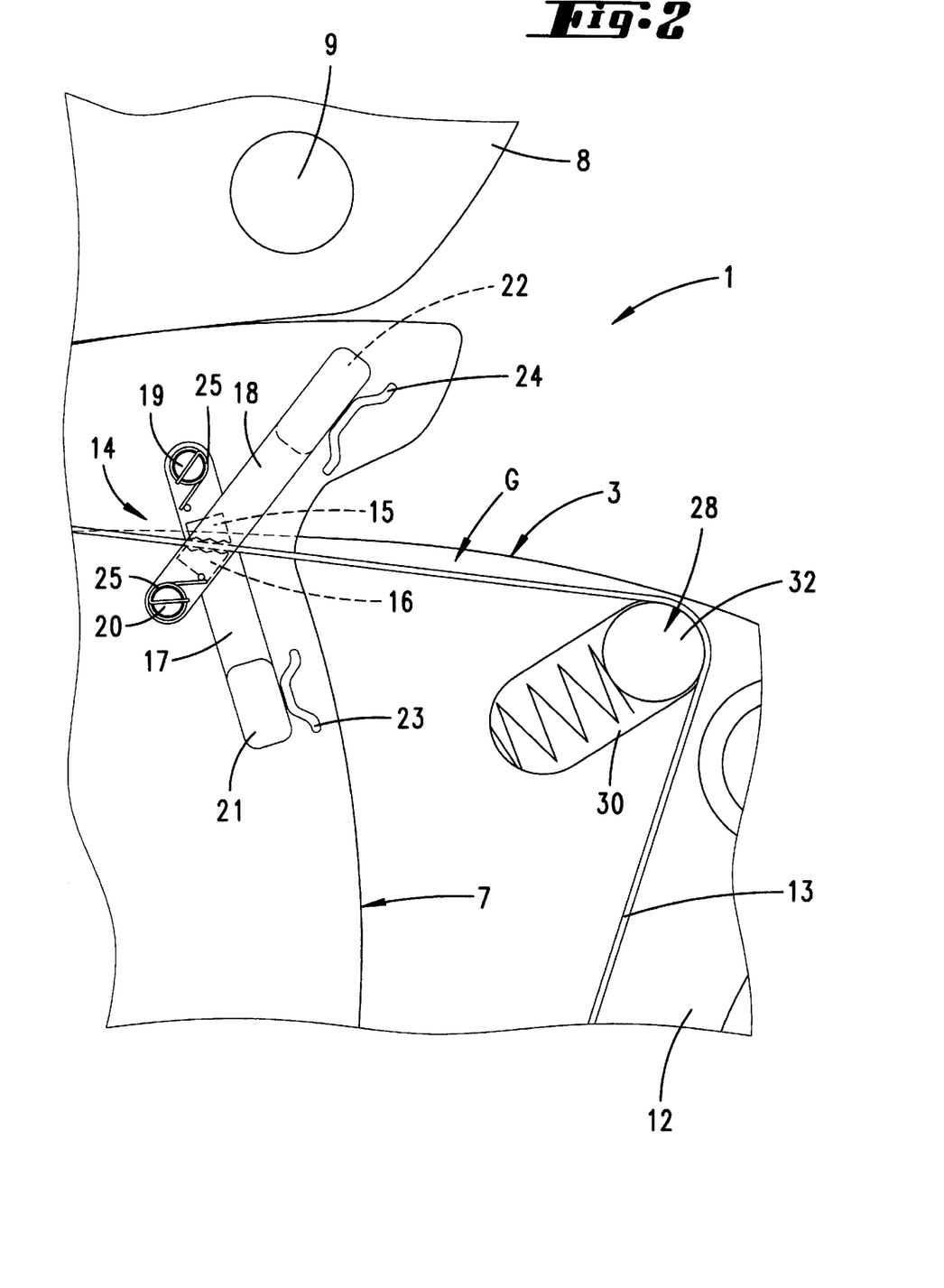
FIG. 2 is an enlargement of FIG. 1 in the vicinity of the clamping device.
Figure 3:
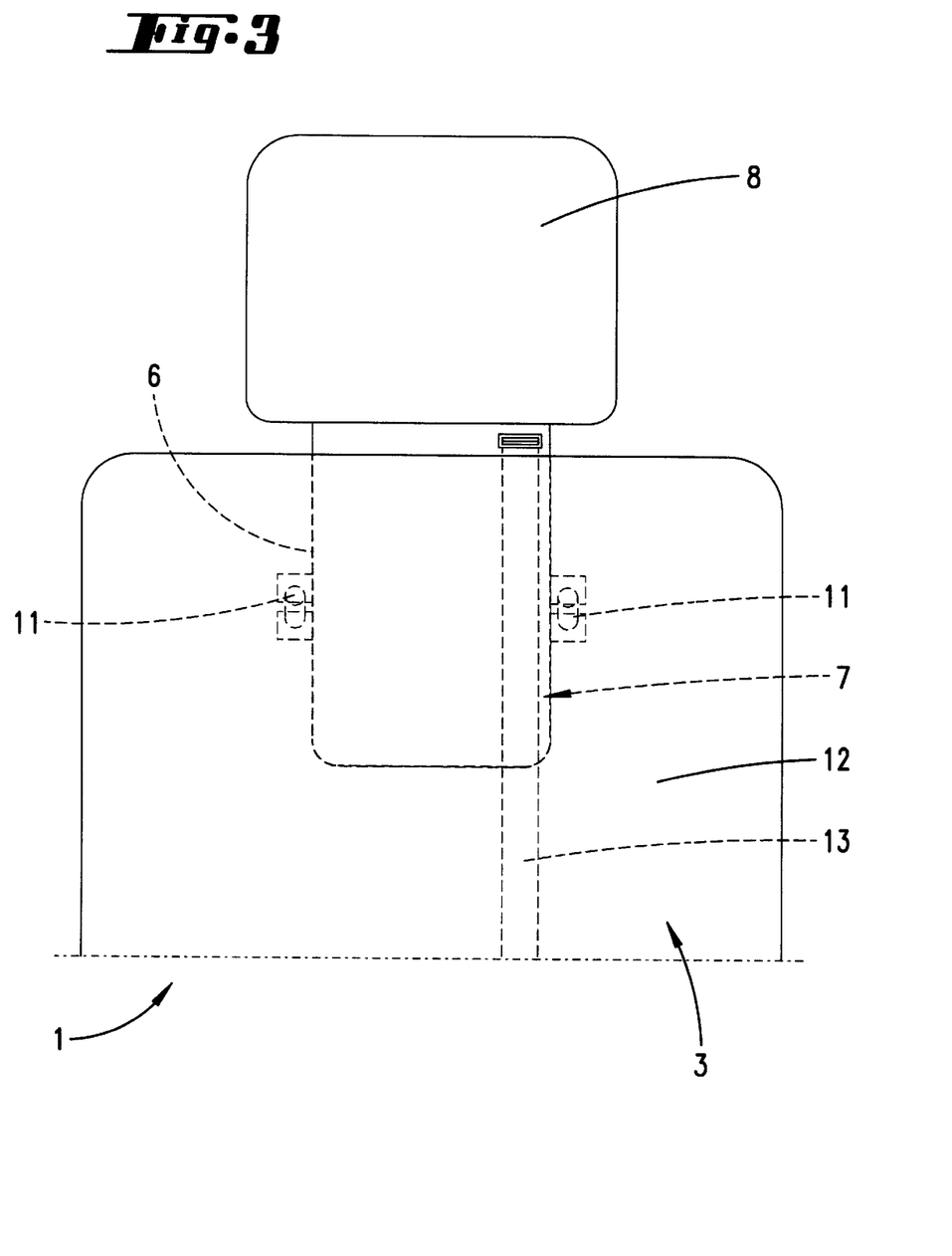
FIG. 3 is a view looking in the direction of arrow III in FIG. 1.
Figure 4:
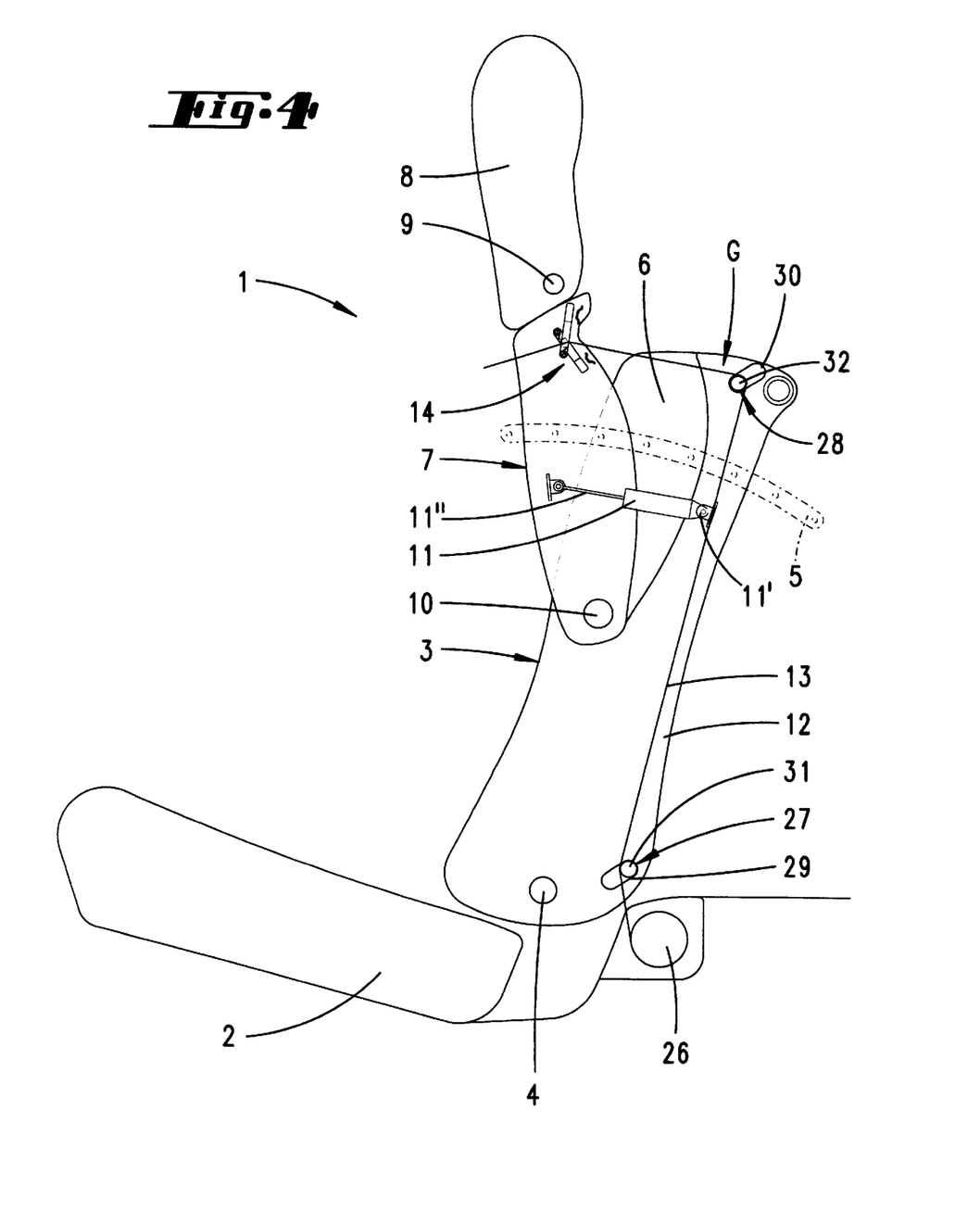
FIG. 4 is a view that is comparable to FIG. 1 but with a headrest support displaced forward as the result of a front-end accident.
Figure 5:
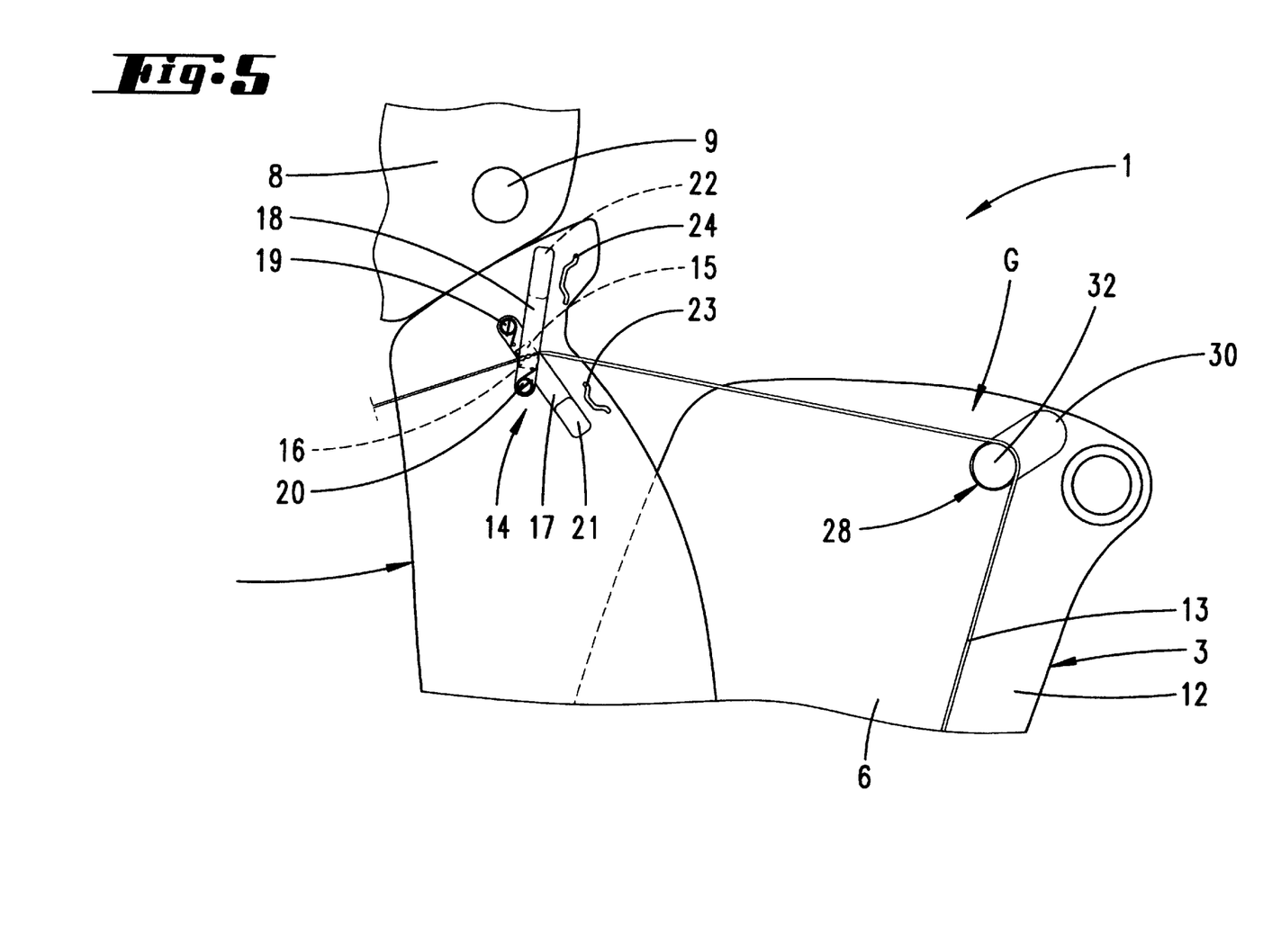
FIG. 5 is an enlargement of the headrest support when displaced forward.
Figure 6:
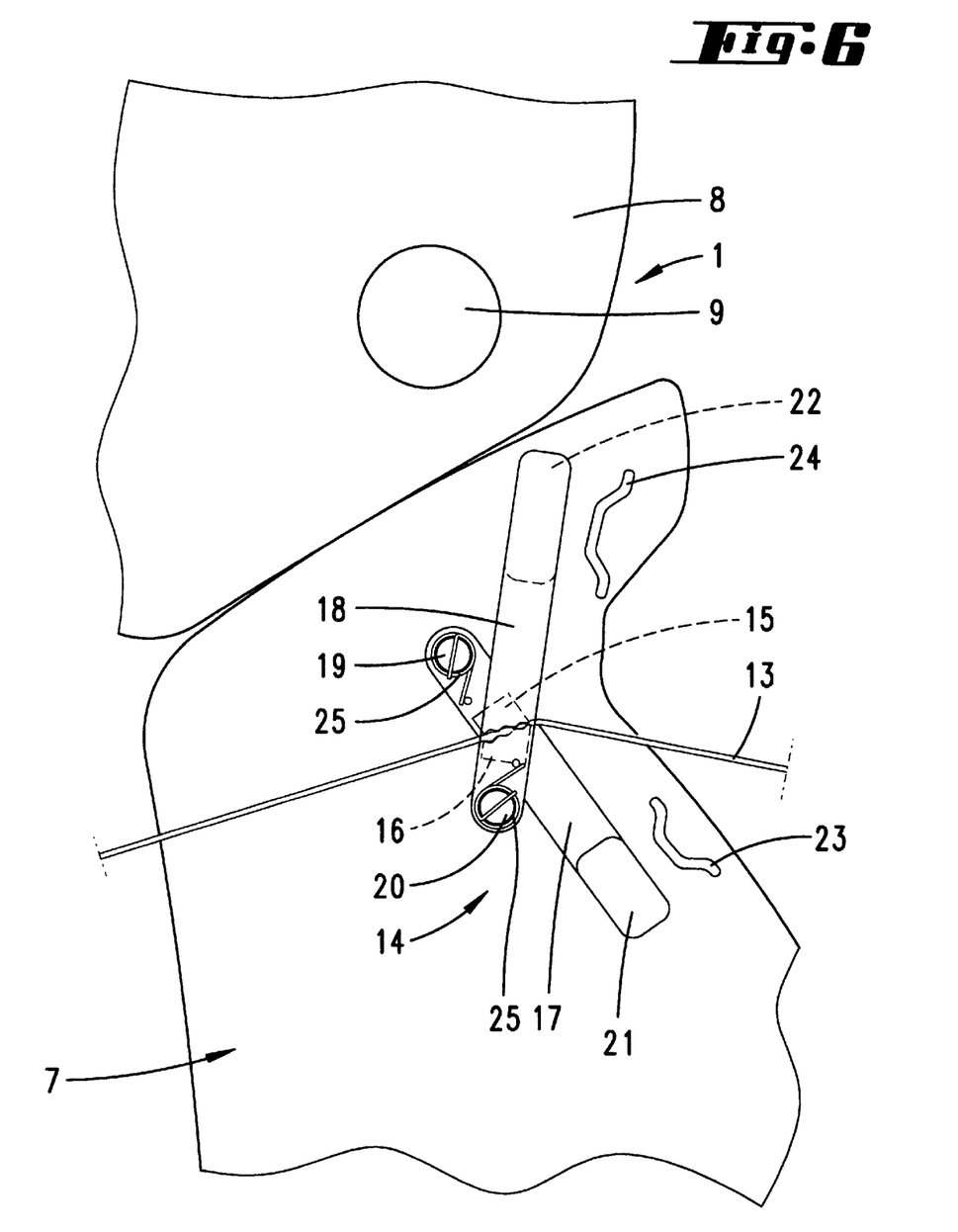
FIG. 6 is another enlargement showing the clamping device.
Figure 7:
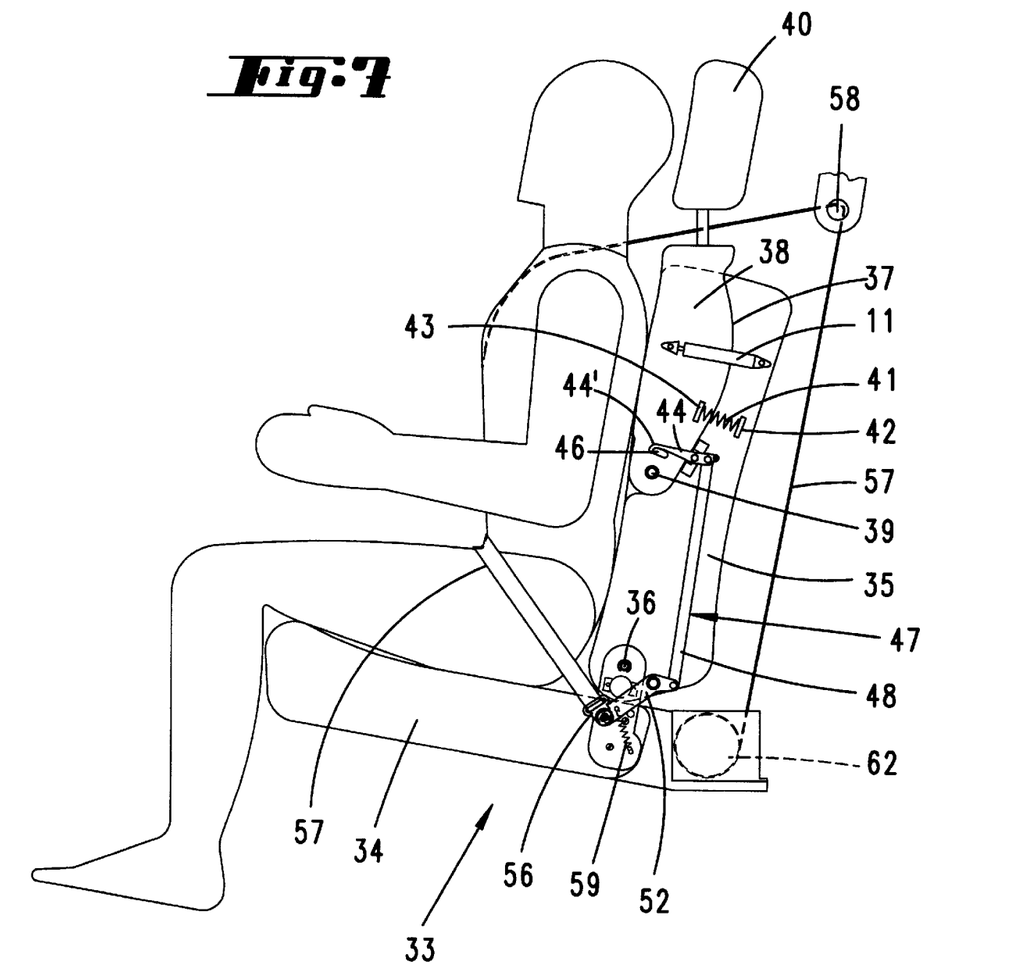
FIG. 7 is a schematic view of a front seat in a motor vehicle with the forward displacement of the headrest support not triggered, relating to the second embodiment.
Figure 8:
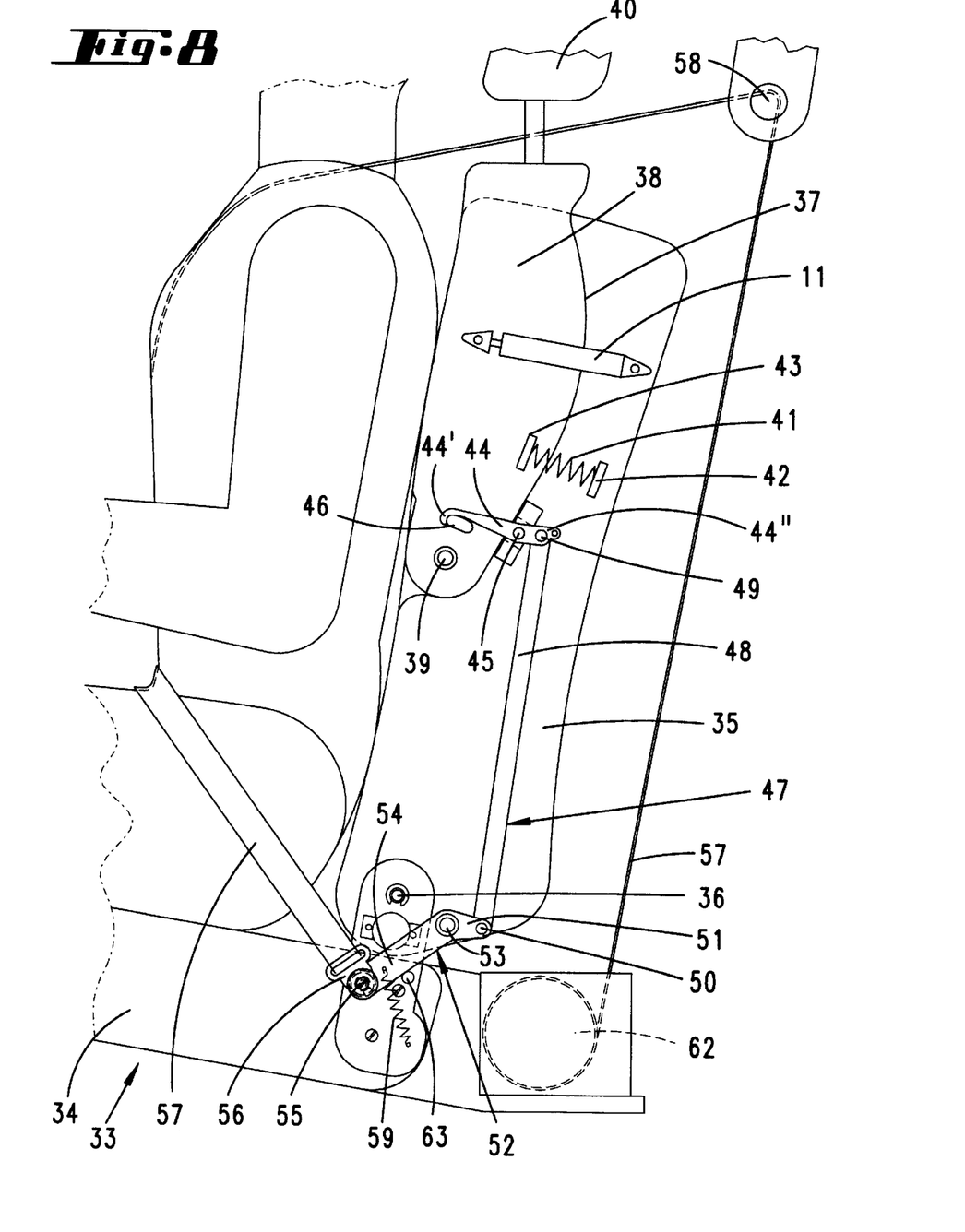
FIG. 8 is an enlargement of FIG. 7 in the vicinity of the fastening point that is in an active connection with a rod drive.

Retractor 26 for seat belt 13 extends in the vicinity of the seat plane and is secured at the back thereof to the body. From retractor 26, whose purpose is to wind up seat belt 13, the latter runs over deflecting means 27, 28 to clamping device 14. Deflecting means 27, 28 act in the manner of damping members. Two such deflecting means 27, 28 are provided in such fashion that deflecting means 27 are provided in the lower range of seat back body 12 and deflecting means 28 are located in the upper area of seat back body 12. As far as deflecting means 27, 28 are concerned, they are deflecting rollers 31, 32 that are supported with damping and are guided in diagonal slots 29, 30 of seat back body 12. The deflecting roller 31 engages seat belt 13 at the rear and causes the seat belt to run at an obtuse angle between retractor 26 and deflecting roller 32. Diagonal slot 29 rises toward the rear of the seat back. Deflecting roller 32 located in front of clamping device 14 on the other hand cooperates with the interior of seat belt 13 in such fashion that seat belt 13 enters clamping device 14 at an angle of approximately 90°. The lengthwise slot 30 in question runs at approximately the median line of the belt section associated with deflecting roller 32.

operation is as follows:

When a person has sat down on the rear seat 1 or on a correspondingly equipped front seat and has buckled up, a belt pattern as shown in FIGS. 1 and 2 prevails. In the event of a front-end accident and the sudden deceleration that occurs therewith, the person on the back seat 1 is moved forward in the direction of travel at the same time that clamping device 14 enters the clamping position relative to seat belt 13. Clamping jaws 15, 16, as a result of the inertia of the heavy projections, engage the seat belt sides in question as a result of the pivoting of clamping jaw supports 17, 18 as shown in FIGS. 4 to 6. As a result of the sudden deceleration that occurs, headrest support 7 pivots forward as a result of its inherent kinetic energy or as a result of forced guidance by the clamped belt, made possible by flexibly supported deflecting means 27, 28. Damping members 11 allow the forward displacement of the headrest support 7. Then when the body moves backward under the influence of the whiplash effect, this shift is taken up by headrest support 7 and headrest 8. Accordingly, the movement of the body during whiplash is reduced by the angle through which headrest support 7 has pivoted. The backward displacement of headrest support 7 however has its movement restricted by damping members 11, so that the backward displacement is accepted with the impact damped, reducing the whiplash effect and the damage to health caused thereby, especially in the area of the cervical vertebrae.

The seat back covering that is stretched over shaft 6 does not have a disadvantageous effect on the forward displacement of headrest support 7.

A tension spring or a compression spring, connected in parallel, can be associated with damping member 11. Preferably a tension spring is connected in parallel at this location so that during the forward movement of the headrest support 7, additional restriction of motion is achieved.

Clamping device 14 preferably has two clamping jaw supports 17 mounted at an angle to one another so that during a pivoting of the entire clamping device to change the tilt of the seat back, a reliable inertia-controlled release of the clamping device is always guaranteed.

According to the second embodiment, shown in FIGS. 7 to 10, the vehicle seat is designed as a front seat 33. It has a seat cushion 34 and a pivotable seat back 35 associated with it. The seat back axis is designated by the number 36.

The seat back 35 receives a headrest support 38 in a shaft 37 that is open at the front and at the top, said support being pivotable outward and forward at its lower end around a horizontal axis 39. Headrest support 38 serves to secure a height-adjustable headrest 40.

As in the first embodiment, a damping member 11 is associated with the headrest support, said member operating in the same way as in the first embodiment. Seat back 35, adjacent to damping member 11, has a power-storage device. This is designed as a spring 41 in the form of a compression spring. On one side, spring 41 abuts a counterbearing 42 of seat back 35 and on the other side it abuts a headrest support counterbearing 43.

In order for the energy inherent in power-storage spring 41 to be effective only in case of danger, a trigger (release)-actuated hook 44 is provided. The latter is located so as to pivot around a pin 45 on the seat back. Hook 44 is also designed with two arms. Hook end 44' facing headrest support 38 fits behind a triggering projection 46, provided above axis 39, of headrest support 38, said projection 46 extending at a distance from axis 39 of the headrest support 38. The other end of the hook 44" is in an operating connection with a rod drive 47. The active connection includes a rod 48, whose upper end is coupled by a pivot pin 49 with the other end 44" of the hook. The lower end of rod 48 engages, by a pivot pin 50, one arm 51 of an angle lever 52 articulated at the lower end of seat back 35. Its joint pin is designated by number 53. On the arm 54 which is longer than arm 51 there is located endwise a mounting point 55 for the end of a seat belt 57 provided with a tab 56. The belt is capable of being pulled off a lockable supply roller 62 and runs from there to a deflection point 58 that is on the body and attached to the B pillar, in order to be secured at fastening point 55 after passing over the person who is on the vehicle seat. In order for fastening point 55 not to be subject to any displacement under normal load conditions like those encountered during driving, angular lever 52 is under the influence of a tension spring 59 that pivots angle lever 52 against a stop pin 63 and holds angle lever 52 in a pretensioned position, and with it fastening point 55 as well.

Figure 9:
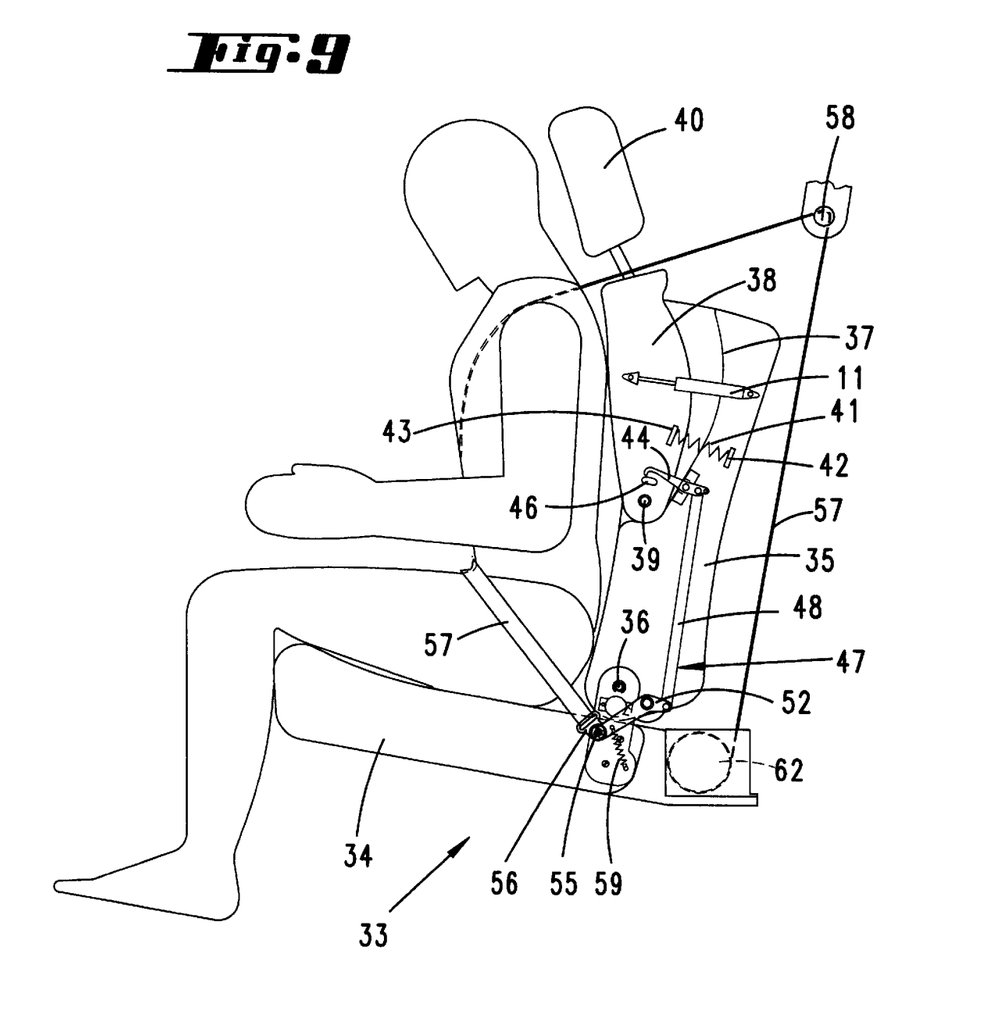
FIG. 9 is a view corresponding to FIG. 7 but with the forward displacement of the headrest support actuated by the trigger.
Figure 10:
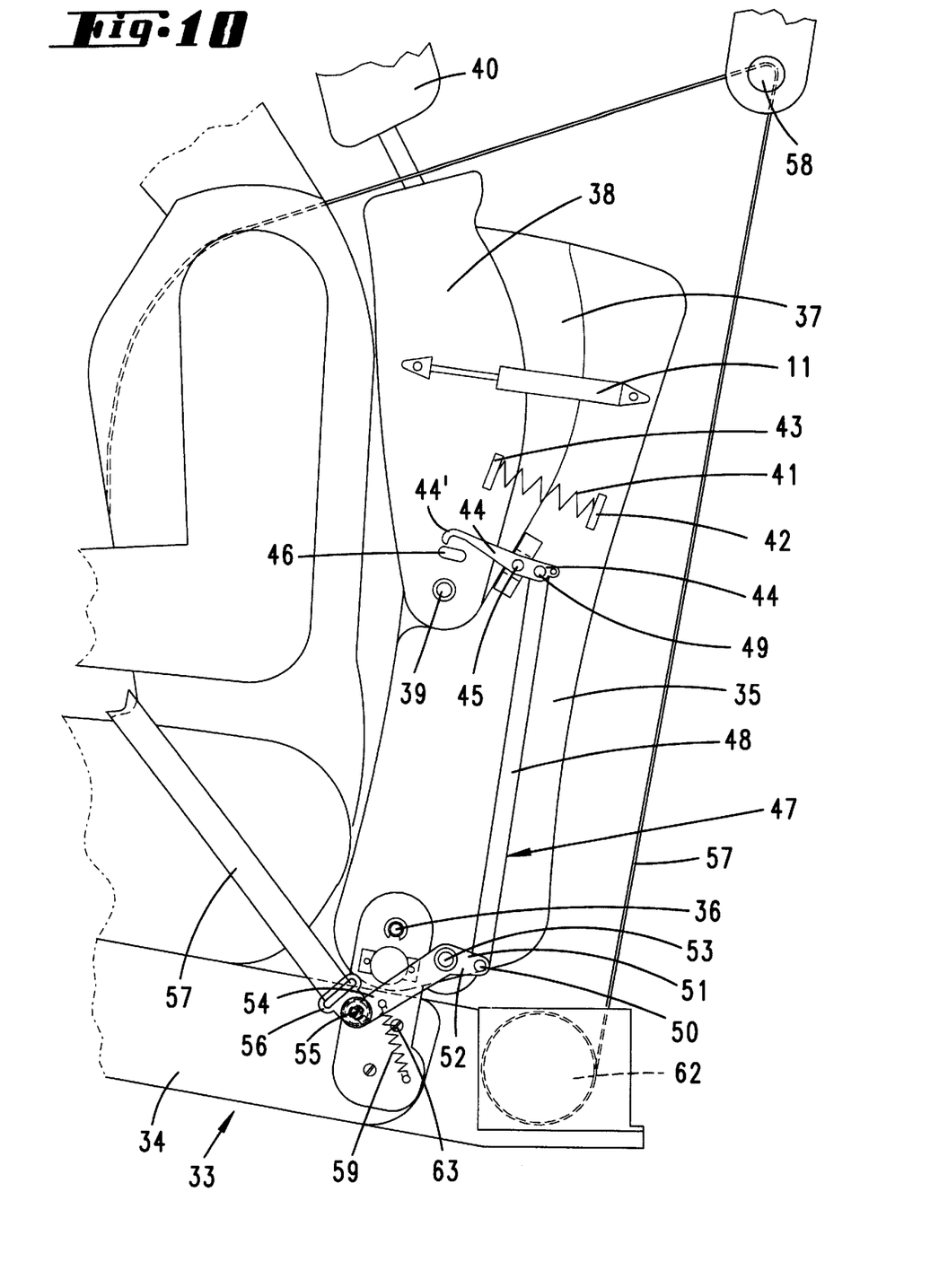
FIG. 10 is the enlargement according to FIG. 8.

The operation of this second embodiment is as follows:

A forward displacement of the person who is on vehicle seat 53 is associated with a frontal collision of the vehicle, see FIGS. 9 and 10. Beginning with this forward displacement, there is a pull on seat belt 57 that causes angle lever 52 to pivot against the force of spring 59. As a result of this trigger actuation, rod 48 is moved in the downward direction by angle lever 52 as a result of the fact that hook 44 pivots and releases triggering projection 46 of headrest support 38. The energy stored in the force-storage spring 41 can now become effective, said energy moving headrest support 38 forward as shown in FIGS. 9 and 10 and thus moving headrest 40 against the back of the head in a supporting position relative to the latter. Damping member 11 is made so that forward displacement of the headrest support is made possible. When the whiplash effect acts on the body, this displacement is captured by the damped headrest support 3 with headrest 40. The capture is supported even before spring 41 is released.

Figure 11:
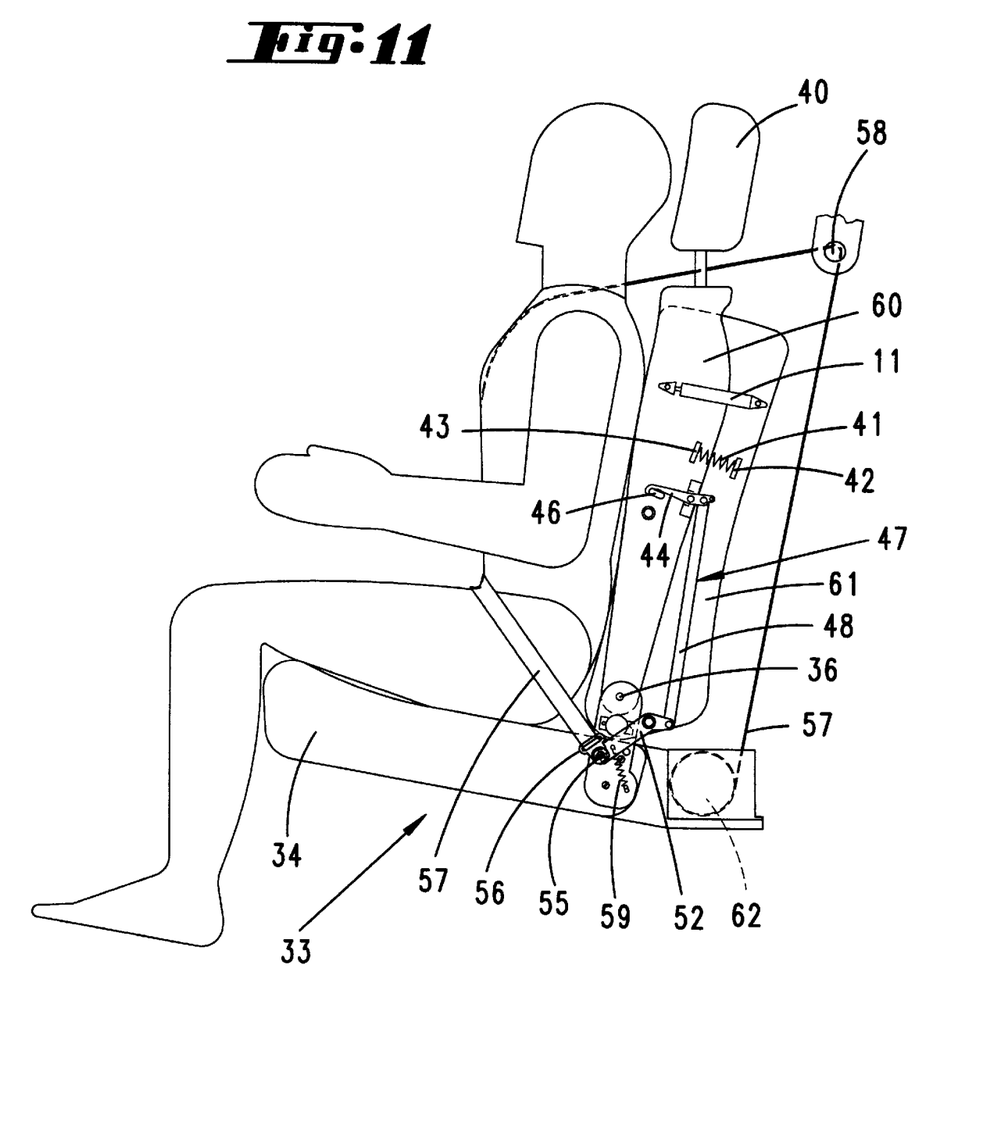
FIG. 11 is a side view of a front vehicle seat in which the headrest support is designed to be pivotable around the seat back axis, relative to the third embodiment.

The third embodiment according to FIG. 11 largely corresponds to that in FIGS. 7 to 10. In contrast, headrest support 60 extends over the entire length of seat back 61 and is pivotably articulated around seat back axis 36. Triggering takes place as in the embodiment described previously, so that this will not be described in greater detail.

What is claimed is:

1. Seat back with a pivotal headrest mounted on a headrest support pivotally mounted with a back of the seat and which headrest support is pivotable outward and forward around a horizontal axis of the seat back with a damping member located between a seat back body and the pivotally mounted headrest support restricting displacement of said headrest support.

2. Seat back with a headrest mounted on a headrest support pivotally mounted within a back of the seat and which headrest support is pivotable outward and forward around a horizontal axis of the seat back with backward displacement of said support having its motion restricted, and further comprising a belt feed-through guide in the headrest support that is provided with a clamping device for a seat belt.

3. Seat back with a headrest mounted on a headrest support pivotally mounted within a back of the seat and which headrest support is pivotable outward and forward around a horizontal axis of the seat back with backward displacement of said support having its motion restricted, and further comprising a clamping device controlled by inertia and/or friction.

4. Seat back with a headrest mounted on a headrest support pivotally mounted within a back of the seat and which headrest support is pivotable outward and forward around a horizontal axis of the seat back with backward displacement of said support having its motion restricted, and further comprising a clamping device having jaws that rest on clamping jaw supports arranged scissorwise.

5. A seat back having a headrest mounted on a headrest support pivotally mounted within a back of the seat and which headrest support is pivotable outward and forward around a horizontal axis of the seat back with displacement of said support having its motion restricted with a clamping device having clamping laws that rest on clamping jaw supports arranged scissorwise and wherein torsion springs maintain the clamping jaw supports in an open resting position abutting stops of the headrest support.

6. Seat back with a headrest mounted on a headrest support pivotally mounted within a back of the seat and which headrest support is pivotable outward and forward around a horizontal axis of the seat back with backward displacement of said support having its motion restricted, and further comprising a retractor located rearward of a seat cushion of the seat for winding up a seat belt guided through deflecting means to a clamping device.

7. Seat back according to claim 6, wherein said deflecting means are damping members.

8. A seat back having a headrest mounted on a headrest support pivotally mounted within a back of the seat and which headrest support is pivotable outward and forward around a horizontal axis of the seat back with displacement of said support having its motion restricted and wherein said seat further comprises a retractor located rearward of a seat cushion of the seat for winding up a seat belt guided through deflecting means to a clamping device wherein the deflecting means are deflecting rollers that are supported by springs and are guided in diagonal slots of a seat back body.

9. Seat back according to claim 2, wherein the horizontal axis is located approximately in the middle of the seat back at a lower end of the headrest support and the clamping device is located in an upper end of said headrest support opposite the horizontal axis.

10. A seat back having a headrest mounted on a headrest support pivotally mounted within a back of the seat and which headrest support is pivotable outward and forward around a horizontal axis of the seat back with displacement of said support having its motion restricted and wherein the headrest support is located in a shaft of upholstery of the seat back.

11. Seat back according to claim 1, wherein the seat back is pivotably adjustable and the headrest is displaceable heightwise.

12. Seat back according to claim 1, wherein the-seat back is formed to receive the headrest support and the headrest support is pivotable around the horizontal axis of the seat back.

13. A seat back having a headrest mounted on a headrest support pivotally mounted within a back of the seat and which headrest support is pivotable outward and forward around a horizontal axis of the seat back with displacement of said support having its motion restricted wherein the displacement of the headrest support is release-actuated and an energy release displaces the headrest forward when released-actuated with the energy generated pyrotechnically.

14. Seat back with a headrest mounted on a headrest support pivotally mounted within a back of the seat and which headrest support is pivotable outward and forward around a horizontal axis of the seat back with backward displacement of said support having its motion restricted, wherein the displacement of the headrest support is release-actuated, and wherein release actuation takes place when a certain seat belt load is exceeded.

15. Seat back according to claim 14, wherein an energy release displaces the headrest support forward when release-actuated.

16. Seat back according to claim 15, wherein the energy is stored in a spring.

17. A seat back having a headrest mounted on a headrest support pivotally mounted within a back of the seat and which headrest support is pivotable outward and forward around a horizontal axis of the seat back with a release-actuated displacement of said support having its motion restricted and wherein an energy release displaces the headrest support forward when released-actuated and upon release-actuation, a hook is moved into a release position, said hook being in an active connection through a rod drive with a fastening point of a seat belt.

18. A seat back having a headrest mounted on a headrest support pivotally mounted within a back of the seat and which headrest support is pivotable outward and forward around a horizontal axis of the seat back with a release-actuated displacement of said support having its motion restricted wherein an energy release displaces the headrest support forward when released-actuated and wherein upon release-actuation, a hook is moved into a release position, said hook being in an active connection through a rod drive with a fastening point of a seat belt wherein the fastening point of the seat belt is displaceable against a force of a pretensioned spring.

19. A seat back having a headrest mounted on a headrest support pivotally mounted within a back of the seat and which headrest support is pivotable outward and forward about a horizontal axis from a back of the seat in the event of a sudden rapid deceleration of the vehicle seat and which headrest support is restrained by a seat belt resting on the shoulder of a person occupying the seat and controlled by an inertia-controlled and/or friction-controlled seat belt clamping device located in a seat belt guide of the headrest support and which seat has a damping device for controlling a displacement movement of the headrest support.

20. A seat back having a headrest mounted on a headrest support pivotally mounted within a back of the seat and which headrest support is pivotable outward and forward about a horizontal axis from a back of the seat in the event of a sudden rapid deceleration of the vehicle seat and which displacement of the headrest support is restricted by a release of energy when a specific load of a seat belt resting on the shoulder of a person occupying the seat is exceeded in that a fastening point of the seat belt is displaced forwardly counter to the force of a prestressed spring located in the seat back.

21. Seat back according to claim 1, wherein the displacement of the headrest support is release-actuated.

* * * * *